United States Patent
Newcomer et al.

(10) Patent No.: US 8,064,703 B2
(45) Date of Patent: Nov. 22, 2011

(54) PROPERTY RECORD DOCUMENT DATA VALIDATION SYSTEMS AND METHODS

(75) Inventors: Daniel A. Newcomer, Cave Creek, AZ (US); Jon Scott Seely, Waddell, AZ (US); Dennis Lee Branham, Gilbert, AZ (US); Paul Kosan, Biberach (DE)

(73) Assignee: Data Trace Information Services, LLC, Santa Ana, CA (US)

( * ) Notice: Subject to any disclaimer, the term of this patent is extended or adjusted under 35 U.S.C. 154(b) by 1128 days.

(21) Appl. No.: 11/384,008

(22) Filed: Mar. 17, 2006

(65) Prior Publication Data

US 2007/0217715 A1 Sep. 20, 2007

(51) Int. Cl.
*G06K 9/46* (2006.01)
*G06K 9/62* (2006.01)
*G06K 9/72* (2006.01)

(52) U.S. Cl. .................. 382/190; 382/224; 382/229

(58) Field of Classification Search .................. None
See application file for complete search history.

(56) References Cited

U.S. PATENT DOCUMENTS 5,359,641 A * 10/1994 Schull et al. ............. 379/106.09
5,937,084 A * 8/1999 Crabtree et al. ............. 382/137
2005/0196074 A1 * 9/2005 Deere ............................ 382/305
2006/0039610 A1 * 2/2006 Cantral ......................... 382/190
2008/0273802 A1 * 11/2008 Takebe et al. ................ 382/229

* cited by examiner

*Primary Examiner* — Samir Ahmed
*Assistant Examiner* — Fred Hu
(74) *Attorney, Agent, or Firm* — Kilpatrick Townsend & Stockton LLP

(57) ABSTRACT

A method of extracting data from a document image includes selecting a document classification for the document image that includes text. The classification is selected from a plurality of predetermined document classifications based on recognized text. The method also includes selecting rules from a database of rules based on the document classification. The rules define data elements to be populated based on recognized document text. The method also includes selecting target data elements from a database of data elements based on the selected document classification and the selected rules. The method also includes recognizing selected portions of the document image. The selected portions are determined by the selected rules. Recognizing selected portions of the document image generates one or more character strings based on recognized text. The method further includes comparing a specific character string to a target data element, thereby producing a match measure based on the comparison. The method also includes creating validated data based on the character string and the match measure and storing the validated data as a data element.

20 Claims, 7 Drawing Sheets

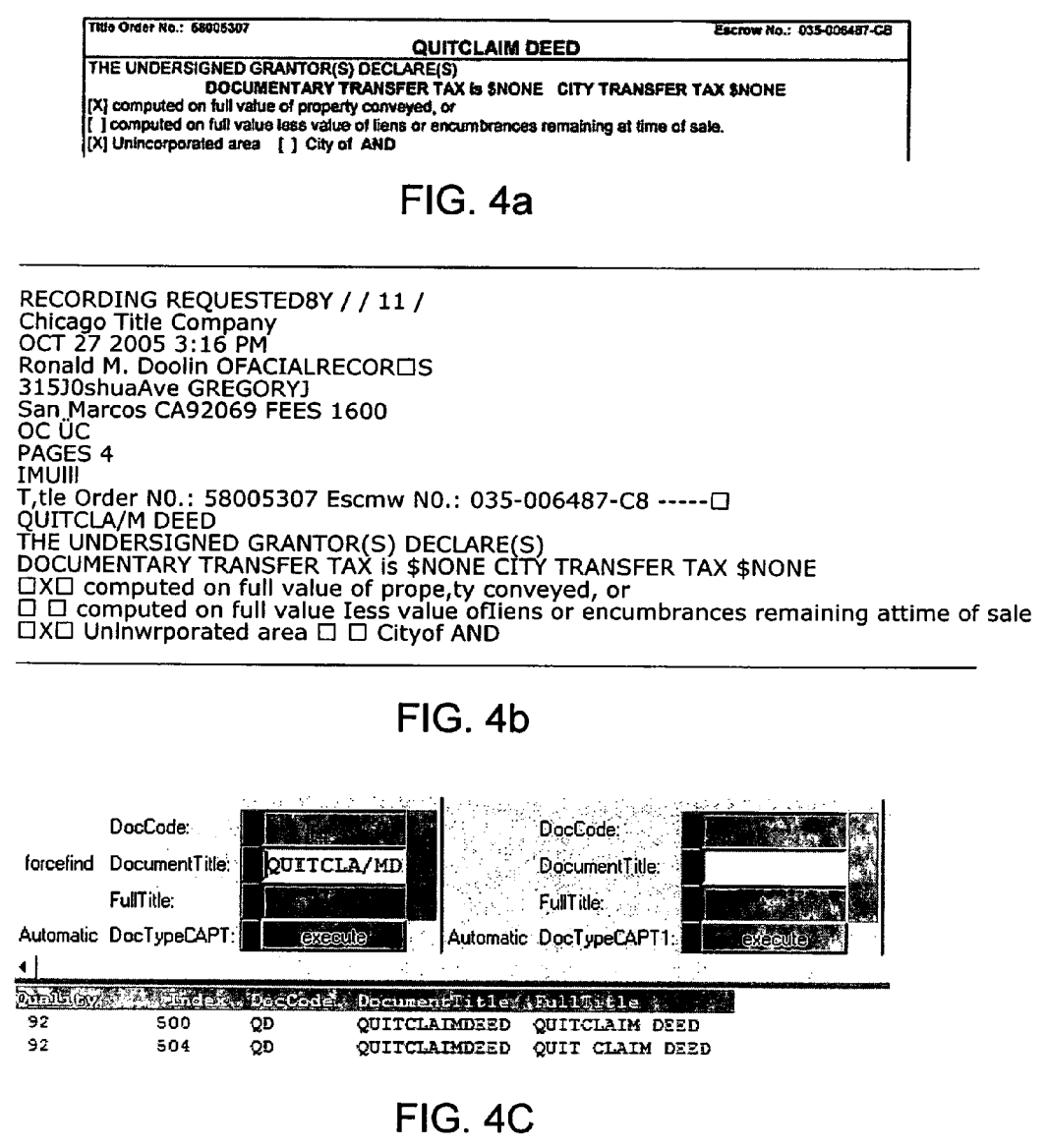

```
Title Order No.: 58005307                              Escrow No.: 035-006487-CB
                    QUITCLAIM DEED
THE UNDERSIGNED GRANTOR(S) DECLARE(S)
        DOCUMENTARY TRANSFER TAX is $NONE   CITY TRANSFER TAX $NONE
[X] computed on full value of property conveyed, or
[ ] computed on full value less value of liens or encumbrances remaining at time of sale.
[X] Unincorporated area  [ ] City of  AND
```

FIG. 4a

RECORDING REQUESTED8Y / / 11 /
Chicago Title Company
OCT 27 2005 3:16 PM
Ronald M. Doolin OFACIALRECOR☐S
315J0shuaAve GREGORYJ
San Marcos CA92069 FEES 1600
OC UC
PAGES 4
IMUlll
T,tle Order NO.: 58005307 Escmw NO.: 035-006487-C8 -----☐
QUITCLA/M DEED
THE UNDERSIGNED GRANTOR(S) DECLARE(S)
DOCUMENTARY TRANSFER TAX is $NONE CITY TRANSFER TAX $NONE
☐X☐ computed on full value of prope,ty conveyed, or
☐ ☐ computed on full value Iess value ofIiens or encumbrances remaining attime of sale
☐X☐ UnInwrporated area ☐ ☐ Cityof AND

FIG. 4b

|  | DocCode: |  |  | DocCode: |  |
|---|---|---|---|---|---|
| forcefind | DocumentTitle: | QUITCLA/MD |  | DocumentTitle: |  |
|  | FullTitle: |  |  | FullTitle: |  |
| Automatic | DocTypeCAPT: | execute | Automatic | DocTypeCAPT1: | execute |

| Quality | Index | DocCode | DocumentTitle | FullTitle |
|---|---|---|---|---|
| 92 | 500 | QD | QUITCLAIMDEED | QUITCLAIM DEED |
| 92 | 504 | QD | QUITCLAIMDEED | QUIT CLAIM DEED |

FIG. 4C

PROPERTY RECORD DOCUMENT DATA VALIDATION SYSTEMS AND METHODS

Embodiments of the present invention relate generally to extracting data from documents. More specifically, embodiments of the present invention relate to systems and methods for extracting property-related data from images of documents.

BACKGROUND OF THE INVENTION

In the United States, when an interest in real property is transferred, documents evidencing the transfer typically are recorded with a local recording entity. Other jurisdictions outside the United States also follow this practice. As such, a future grantee of an interest in the same real property may determine whether his grantor actually owns what he is attempting to transfer.

Title companies are frequently engaged by grantees, mortgagees, and the like (i.e., anyone receiving an interest in real property) to insure the quality of title being transferred. To do so, the title company typically examines the "chain of title" to the property interest begin transferred to determine its status and/or quality. Based on what it finds, a title company may issue a title policy that insures the transfer. In most cases, the policy includes conditions that are determined by events related to previous transfers of the property.

Determining how to properly condition a title policy may be a laborious task. It generally requires that a title examiner locate and inspect each recorded document in a parcel's chain of title, at least back to a certain point in time. This is complicated by the fact that most recording jurisdictions do not provide electronic searching systems. While an electronic index may assist an examiner to locate documents, the index does not include all the relevant information needed to underwrite the policy. Hence, the title examiner typically must look at each document or an image thereof. Given the extremely time consuming task of examining property records, it would be helpful to have more robust electronic property record search systems. Of course, title companies and title examiners are not the only entities that desire such systems.

Several entities have attempted to create electronic "title plants" that give title examiners, abstractors, and others the ability to quickly, efficiently, and accurately search recorded property records. Investing the effort to create a title plant is generally a tradeoff between the expected income and the cost of creating it for a given jurisdiction. Hence, efficient processes are needed to extract valid data from recorded property records and verify the accuracy of the extracted data.

BRIEF SUMMARY OF THE INVENTION

Embodiments of the present invention provide a system configured to extract data from a document image and validate the extracted data. The system includes means for selecting a document classification for the document image. The document image includes text and the classification is selected from a plurality of predetermined document classifications based, at least in part, on recognized text. The system also includes means for selecting rules from a database of rules based on the document classification. The rules define data elements to be populated based on recognized text. The system also includes means for selecting target data elements from a database of data elements based, at least in part, on the selected document classification and the selected rules and means for recognizing selected portions of the document image. The selected portions are determined, at least in part, by the selected rules and the means for recognizing selected portions of the document image generates one or more character strings based on recognized text. The system also includes means for comparing a specific character string to a target data element. The means for comparing produces a match measure based at least in part on the comparison. The system also includes means for creating validated data based on the character string and the match measure and means for storing the validated data.

In such embodiments, the means for storing the validated data may include means for storing the match measure. The selected portions may have document coordinates associated therewith and the means for storing the validated data may include means for storing the document coordinates. The database of data elements may be a title plant. The document may be a recorded property transfer document. The document may be a warranty deed, a quit claim deed, a mortgage, a release, and/or the like. The target data elements may include at least two of a grantor name, a grantee name, a legal description, a property address, and/or the like. The system also may include means for selecting additional rules from the database of rules based on the validated data. The system also may include means for comparing a plurality of distinct character strings to a plurality of distinct data elements. The means for comparing may produce a match measure based at least in part on the comparison.

In other embodiments, a method of extracting data from a document image includes selecting a document classification for the document image. The document image includes text and the classification is selected from a plurality of predetermined document classifications based, at least in part, on recognized text. The method also includes selecting rules from a database of rules based on the document classification. The rules define data elements to be populated based on recognized document text. The method also includes selecting target data elements from a database of data elements based, at least in part, on the selected document classification and the selected rules. The method also includes recognizing selected portions of the document image. The selected portions are determined, at least in part, by the selected rules and recognizing selected portions of the document image generates one or more character strings based on recognized text. The method further includes comparing a specific character string to a target data element. Comparing produces a match measure based at least in part on the comparison. The method also includes creating validated data based on the character string and the match measure and storing the validated data as a data element.

In such embodiments, the method may include storing the match measure. The selected portions may have document coordinates associated therewith and the method may include storing the document coordinates. The database of data elements may be a title plant. The document may be a recorded property transfer document. The document may be a warranty deed, a quit claim deed, a mortgage, a release, and/or the like. The target data elements may include at least two of grantor name, grantee name, legal description, property address, and/or the like. The method may include selecting additional rules from the database of rules based on the validated data. The method also may include comparing a plurality of distinct character strings to a plurality of distinct data elements. Comparing may produce a match measure based at least in part on the comparison.

In still other embodiments, a system for extracting data from document images includes an image database configured to receive and store document images. The images are arranged into batches of images. The system also includes an administration server configured to select image batches for a data extraction process. The administration server has a rules database associated therewith. The method also includes one or more production clients each configured to respond to commands from the administration server to execute the data extraction process and a validation server configured to store a plurality of data elements. A production client, in executing the data extraction process, selects a document classification for a document image. The document image includes text and the classification is selected from a plurality of predetermined document classifications based, at least in part, on recognized text. The production client also selects rules from the rules database based on the document classification. The rules define data elements to be populated based on recognized document text. The production client also recognizes selected portions of the document image. The selected portions are determined by the selected rules and recognizing selected portions of the document image generates one or more character strings based on recognized text. The production client also sends character strings to the validation server for comparison to target data elements selected from a database of data elements based, at least in part, on the selected document classification and the selected rules. The production client also, for a specific character string, receives a match measure from the validation based on a comparison of the specific character string to a specific data element and, for the specific character string, creates validated data based on the character string. The production client also stores the validated data as a data element. In executing the data extraction process, the production client may select additional rules from the database of rules based on the validated data.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 4a- 4c depicts various input and output products for the document title determination process of FIG. 3.

DETAILED DESCRIPTION OF THE INVENTION

Figure 1:
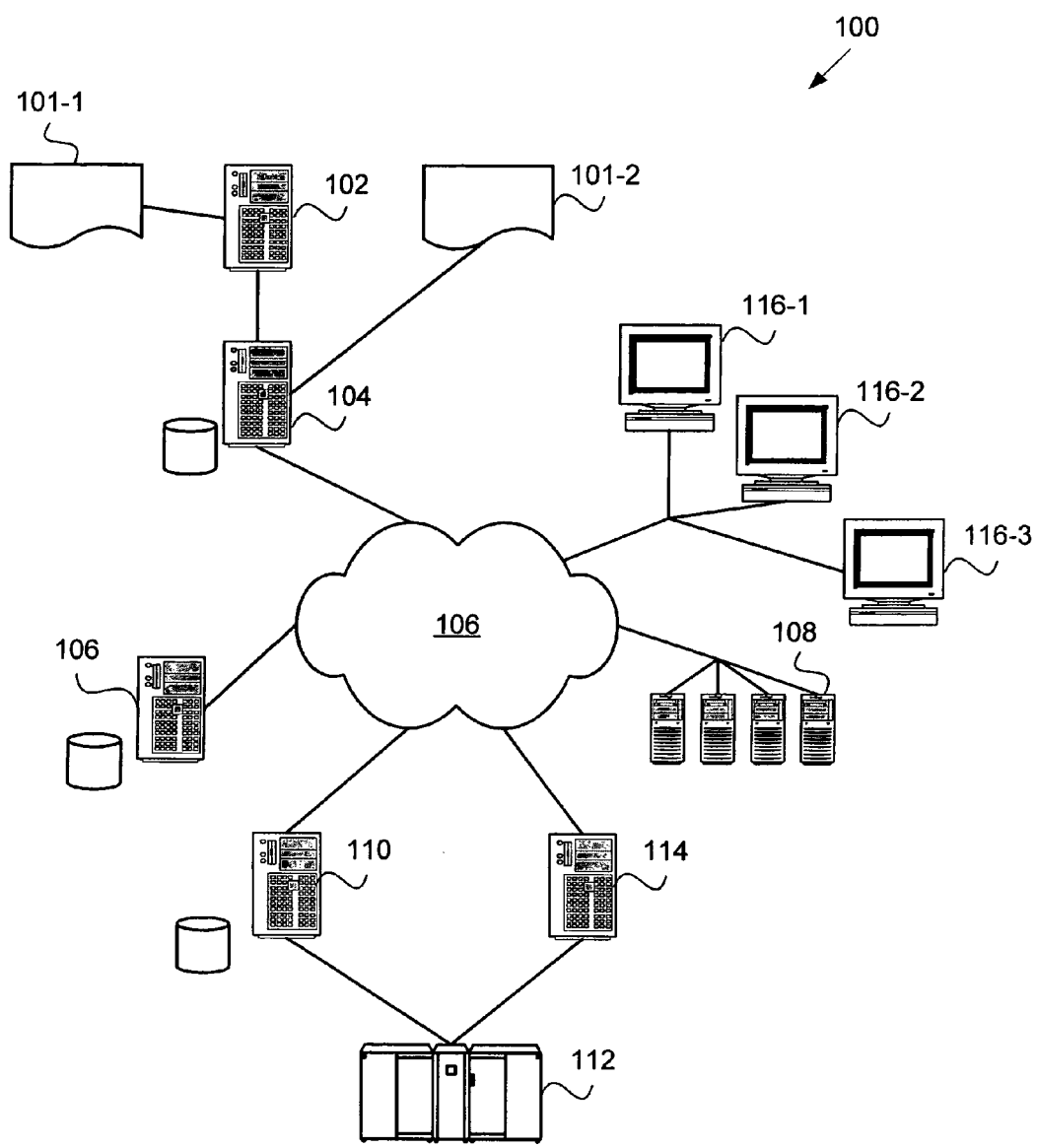
FIG. 1 illustrates a system for extracting data from document images according to embodiments of the present invention.

Embodiments of the present invention relate to systems and methods for extracting data from documents. In order to provide a context for describing embodiments of the present invention, embodiments of the invention will be described herein with reference to extracting data from property records, though this is not a requirement. Those skilled in the art will appreciate that the systems and methods described herein may be applied to extracting data from virtually any type of document or document image.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

According to embodiments of the present invention, data is extracted from property records, verified and stored for later use. Exemplary data includes grantor and grantee names, property address, legal description, transfer date, and the like. Because this information may be obtained from any of a number of different document types, the process includes identifying a document type by first recognizing at least a portion of the document. Thereafter, data is extracted based on the document type. Once a document has been completely recognized, the extracted data is verified, which may include 100% blind verification or partially assisted verification.

Having described embodiments of the invention generally, attention is directed to FIG. 1, which illustrates an exemplary data extraction system 100 according to embodiments of the invention. Those skilled in the art will appreciate that the system 100 is merely exemplary of a number of possible embodiments. The system receives images 101 of recorded property documents. The document images 101 may be in any of a variety of formats, some of which may require conversion through a process that may take place on a computing device 102. For example, the images 101-1 may be the actual documents, copies of the actual documents in paper form, microfilm or microfiche versions of the documents, electronic images in a format not compatible with the remainder of the process, and/or the like 101-1. In another cases, the images 101-2 may be properly formatted, properly labeled with a file name that may be a recording number, grouped into batches of a suitable size, and classified according to jurisdiction.

If the images require conversion, a process operating on the computing device 102 may include scanning the images into electronic form (using an associated scanning device), pre-processing the images to locate a document number, saving each image or group of documents to a file named with the document's document number, and batching the files into manageable batches. Properly named and batched image files 101 are then stored at an image server 104 having an associated database. An index file also may be created or received that identifies the file in the batch and may include each image's file name, document number, number of pages, and/or the like. In a specific embodiment, images are stored a .tiff files having a file name corresponding to a document number generated at the time of recording, placed into batches with other document images from the same recording jurisdiction, and stored in a hierarchical file structure according to State, subclass, and county or recording jurisdiction. The number of images in a batch typically is 50, but the number may be varied according to a suitable workload for any human processing required on the batch, as will be described in greater detail hereinafter.

The image server 104 may be any suitable computing device, typically of server class with a server operating system to accommodate multiple simultaneous connections. The associated data storage arrangement may be any suitable storage arrangement for storing image files.

The system 100 also include a network 106 for facilitating communication among the various system components. The network 106 may be, for example, the Internet, an intranet, a wide area network, and/or the like, and may include wired and/or wireless connections.

The system 100 also includes an administration server 106 that manages the workload of various client devices 108, stores application software for the client devices 108 or other system components, maintains tables or records of acquired data as images are processed, and/or the like. The server 106 may be any suitable computing device for accomplishing these functions.

The client devices 108 are tasked by the administration server 106 to perform much of the workload of the system. The number of clients 108 may be scaled according to workload demands. When the administration server 106 recognizes the presence of an incoming image batch on the image server 104, it checks the workload status of the clients 108 and attempts to identify an idle client. It then directs the client to initiate processing of the batch. In response, the client 108 may acquire application software from the administration server 106, acquire images from the image server 104, and begin processing the batch of images.

The system 100 also includes a validation server 110, which may be any suitable computing device, and associated data storage arrangement. The validation server 110 is in communication with one or more processing clients 108 as the client is processing a batch and assists the client by validating data the client recognizes on the image. The validation server 110 acquires data from various sources, including a mainframe 112, the administration server 106, the image server 104, and/or the clients 108. For example, based on the state and county of the batch being processed, the validation server 110 may acquire a list of document titles commonly used in that county, a list of subdivision names found in the county, a list of proper names or company names of grantors or grantees who own or have owned property interests in the county, and/or the like. The validation server 110 also may receive an index file that lists the document numbers for the images in the batch being processes. Many such examples are possible.

As will be described in greater detail hereinafter, as a client 108 is processing a batch, it "recognizes" (e.g., performs Optical Character Recognition (OCR) of) a document or portion thereof and sends recognized character strings to the validation server 110. The validation server attempts to match the recognized character string to its data store, and returns a match measure based on what it finds. The client 108 then uses the information to make decisions about the quality of the data. If the data is of sufficient quality (e.g., it has a percentage match above a match threshold), the data may be considered good with respect to the document. The data may then be written to a record at the administration server 106, or other appropriate location, and/or may be used to determine additional process that should be executed to gather additional data from the document and/or further validate other recognized data. In some embodiments, coordinates on the document from which the data was acquired may be stored for later use during a verification process. The match measure for each acquired data element also may be stored for later use. Once a document is fully processes, the next document in the batch is processed.

Upon completion of a batch by a client 108, the records for the batch are placed on a data entry server 114. Thereafter, verification workstations 116 access the records and verify the results. This may include viewing each data element and the associated portion of the document image from which the data was acquired. In some embodiments, 100% of the data is verified. In other embodiments, only data having a match measure below a verification threshold is verified. Many such examples are possible.

Once the data has been properly verified, it may be posted to a title plant residing on the mainframe 112. The mainframe 112 is generally accessible for commercial purposes. For example, title companies may use the data to underwrite title policies.

As previously stated, those skilled in the art will appreciate that the system 100 is merely exemplary of a number of possible system embodiments.

Figure 2:
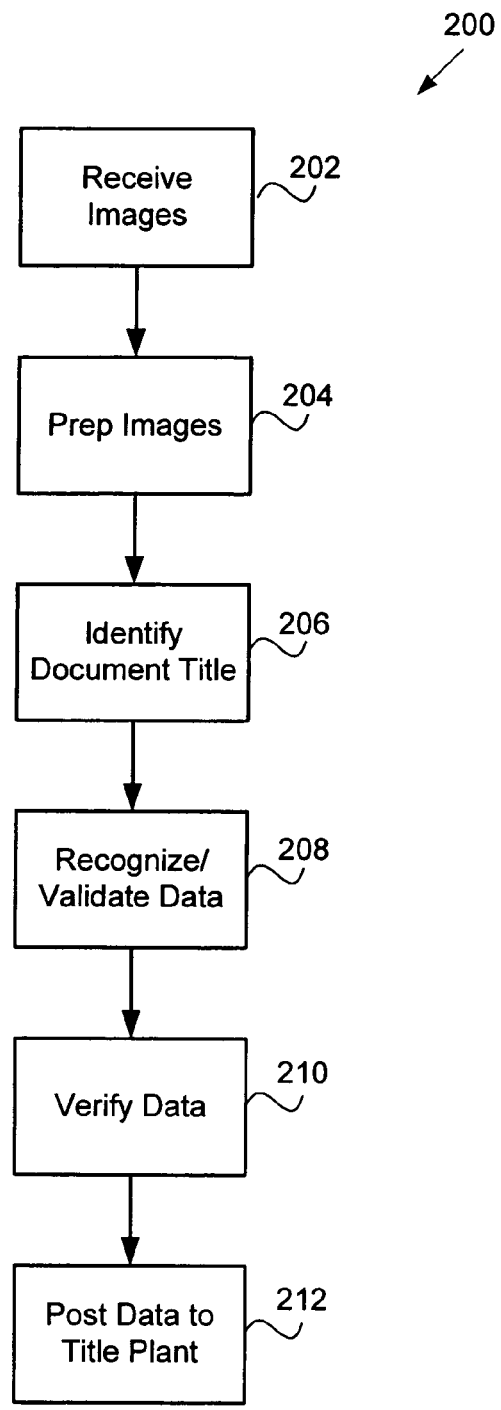
FIG. 2 illustrates the basic steps in a process for extracting data from document images according to embodiments of the invention, which process may be implemented in the system of FIG. 1.

Having described an exemplary system according to embodiments of the invention, attention is directed to FIG. 2, which illustrates an exemplary method 200 according to embodiments of the invention. The method 200 may be implemented in the system of FIG. 1 or other suitable system. Those skilled in the art will appreciate that the method 200 is merely exemplary and other exemplary methods may include more, fewer, or different steps than those illustrated and described herein. Moreover, the various steps in the method 200 may be traversed in orders different that those illustrated and described herein, as is also the case for other methods described herein.

The method 200 begins with receipt of images at step 202. At this point the images may be in any form, including paper documents, paper copies, electronic images, micro film or microfiche images, and/or the like. Because, however, the remainder of the process may be more efficient if the images are of standard type and batched in a standard manner, it may be necessary to preprocess, or prep, the images at block 204. If so, the source images are scanned or otherwise converted to a suitable electronic form, converted from grayscale or color to properly segmented bitonal images, saved using a file name indicative of a document number, which may be a recording number, paginated into individual pages or individual documents, grouped into batches of appropriate size, and stored in a hierarchical file structure with recording jurisdiction at the lowest level and state at the highest level. If not available previously, an index also may be created, which may include each document in the batch by file name, the number of pages in the image file, and/or the like.

Once a batch is available for processing, each document in the batch is processed page-by-page beginning with determining a document title at block 206. Document title determination will be described in greater detail hereinafter. Generally, however, document title determination includes recognizing a portion of the document, comparing recognition results to target document titles until a suitable threshold match is achieved, then assigning a document code, or document type, to the document. The specific document code determines, to a large extent, future processing steps.

Based on the document's type, data is recognized and validated at block 208. This may include comparing any text string recognized on the document to target data. The target data may come from a preexisting title plant, known business and personal names in the recording jurisdiction, geographic information in the recording jurisdiction like cities, subdivisions, and/or the like, and any of a wide variety of other sources. In some embodiments, the validation process pairs various combinations of recognized character strings with corresponding pairs of target data elements. For example, if a first recognized data string is believed to be a grantor's name and a second recognized data string is believed to be a property address and/or legal description, the first and second recognized strings may be compared to corresponding target grantee names and property address and/or legal descriptions. If a grantor name matches the most recent grantee name for the specific parcel that matches the address or legal, there is a high degree of confidence that the grantor and address are correct as recognized and may be assumed to be valid.

At block 208, appropriate data elements are stored to a record associated with the document. A match percentage coordinated location on the document of the recognized data, and other pertinent information also may be stored in the record.

At block 210, data elements are verified. This step is a human verification process that compares the validated data to the image or portion thereof from which the data was acquired. The verification may be 100% blind, in which case the data is keyed from the image. If the human-keyed data does not match the machine-recognized and validated data, then an alert informs the operator that the data should be re-verified. Conveniently, even in a 100% blind verification process, the coordinate information obtained from the machine-recognition process greatly improves the efficiency of the verification process by only presenting the operator with the image portion believed to contain the data or interest.

In other embodiment, the verification process is not a 100% blind verification. In some embodiments, 100% of the data is verified; however, data elements which were validated to a higher threshold may not require blind verification. For example, data elements validated between 90 and 100% confidence may have the validated results presented to the verification operator for confirmation. In other embodiments, data elements validated above, for example, a 95% confidence may require no verification, while data elements validated with a confidence in the range of 85% to 95% may be presented for non-blind verification. Many such examples are possible.

Once all data elements are verified, the data may be populated into a title plant for commercial use. The data elements also are available for use in future validation processes as newly-recorded documents are processed.

Figure 3:
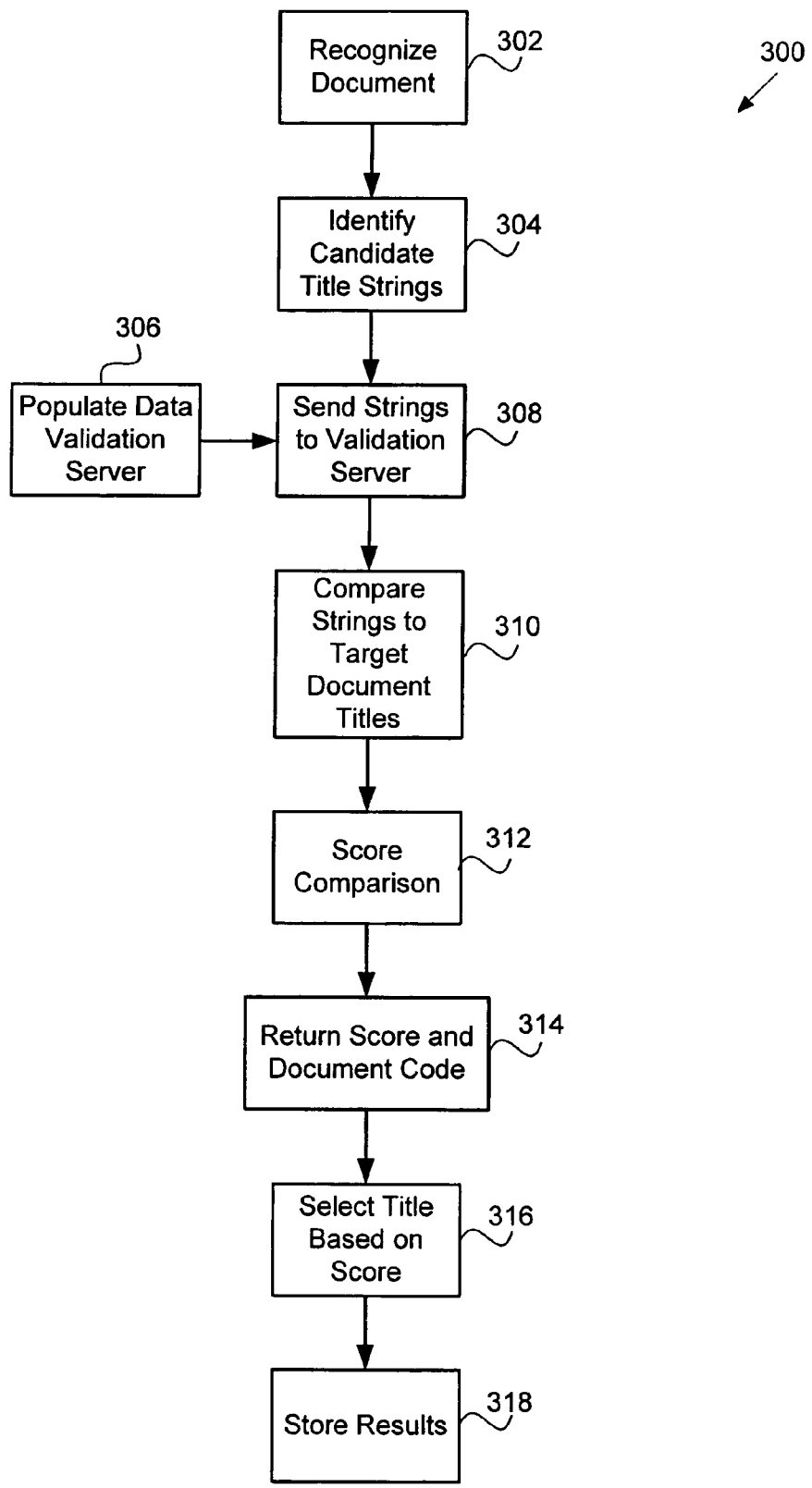
FIG. 3 depicts a document title determination process according to embodiments of the present invention.

Having described an exemplary embodiment of the invention generally, attention is directed to FIG. 3, which illustrates an exemplary document title identification method 300 according to embodiments of the invention. The method 300 may be comprised by the step 206 of the method 200 of FIG. 2, although that is not necessarily the case. The method 300 begins at block 302, at which point a document is recognized. This step may include recognizing an entire document or only a portion thereof. Because it has been determined that, to a high degree of confidence, a document title typically is found in the top one third of the first page of a document, this step may include recognizing only that portion. The portion may be adjusted, however, to achieve better results.

Recognizing the document includes performing OCR on the document image. In some cases this produces text characters that correlate perfectly with text characters contained on the document. In some cases, however, text characters are incorrectly recognized to be different characters, non-alphanumeric characters, punctuation marks, and/or the like. Such occurrences will be dealt with in later steps. The recognizing process simply attempts to recognize markings on the document image as characters within a finite character set (e.g., English language characters, roman numerals, recognized punctuation, and selected foreign characters). The recognition step also may include condensing character strings to eliminate intermediate blank characters. FIGS. 4a and 4b depict, respectively, a portion of a document image and the results of an exemplary recognition step performed according to embodiments of the invention.

At block 304, candidate title strings are identified. A candidate title string may include any string or strings of recognized characters. In some embodiments, each line of recognized text is a candidate title string, but this is not necessarily the case. In some cases, a candidate title string may include characters from multiple lines.

At block 306, the data validation server is populated with target document titles appropriate for the jurisdiction in which the subject document was recorded. The knowledge of which document title set to load into the data validation server may come from the file structure in which the current batch is stored, an index file associated with the batch, or other appropriate source. It should be apparent to those skilled in the art that step 306 may be accomplished only once per batch and may be accomplished prior to the first page of the first document being recognized.

At block 308, candidate title strings are sent to the data validation server for evaluation. As each candidate title string is received, the validation server compares the candidate title string to target document titles loaded at step 306. The comparison is scored, or measured, at block 312. The score may be a percentage measure determined by the number of matching characters out of the number of characters compared, although other possibilities exist. In some embodiments at block 314, information is returned to the processing client for each comparison. In other embodiments, information is returned only upon the occurrence of a comparison having a match percentage above a predetermined threshold. In still other embodiments, candidate title strings are sent to the validation server only until a comparison produces a match percentage above the predetermined threshold, after which the comparison process concludes.

In some embodiments, a candidate title string may match multiple target document titles. This situation is depicted in FIG. 4c, wherein the candidate string "QUITCLA/MDEED" matched both "QUITCLAIM DEED" and QUIT CLAIM DEED" at 92%. Hence, it may be necessary in some cases to select a title based on the comparison score. If so, this is accomplished at block 316. In this specific embodiment, however, both target document titles are associated with the same document code "QD," which in this specific embodiment is the ultimate object: determining a document classification, or code, or type. The document type, as will be described in greater detail hereinafter, to a large extent, determines what takes place in subsequent steps and processes.

Once the document title or document type, depending on the specific embodiment, is determined, at block 318 the results are stored in a record associated with the document. Additional information that may be stored includes a coordinate location on the document of the candidate string that produced the document title match, the match quality, the validated document title (i.e., the target document title), and/or the like. The process then proceeds to data validation as described immediately hereinafter.

Figure 5:
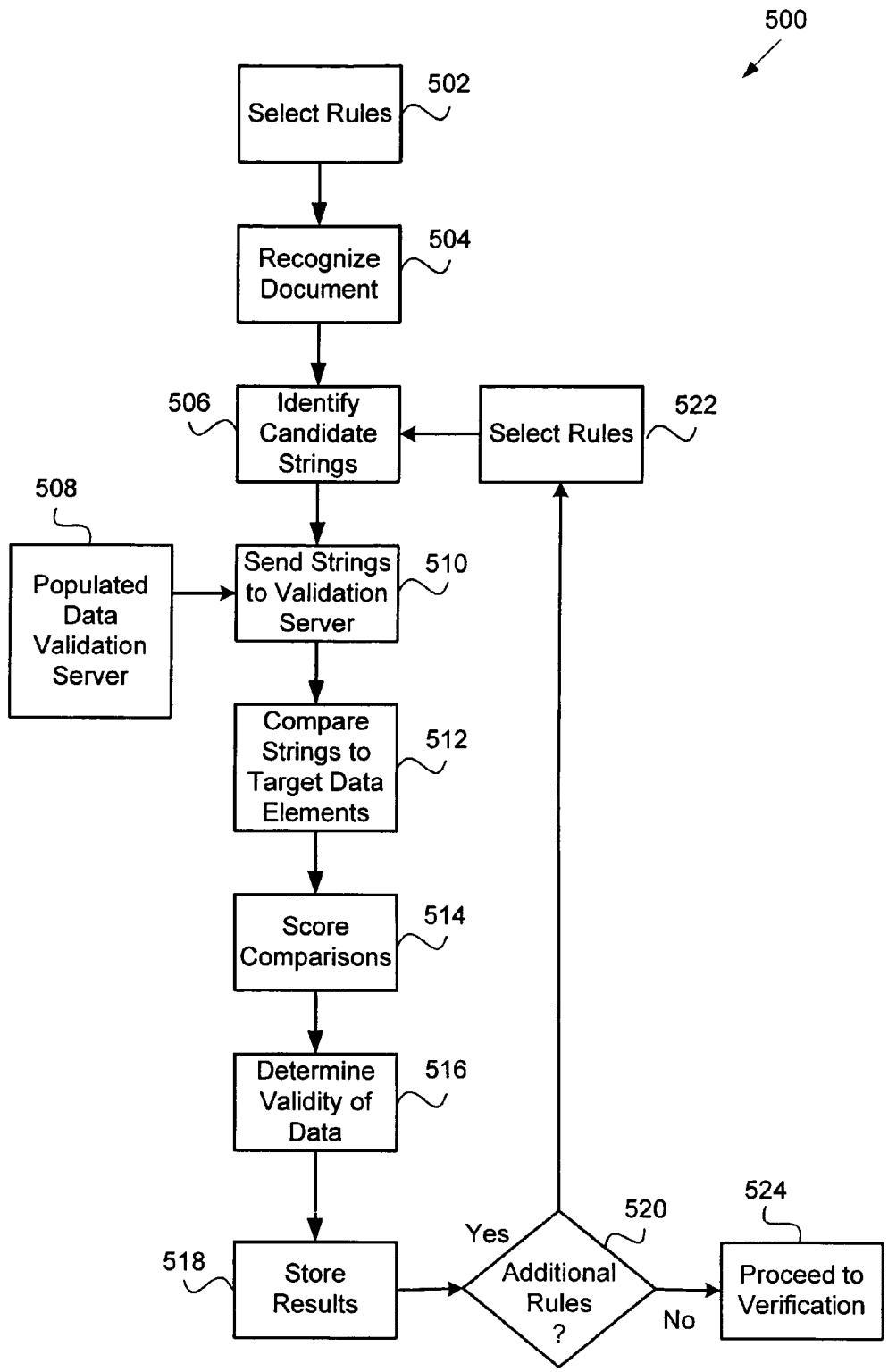
FIG. 5 depicts a data validation process according to embodiments of the invention.

FIG. 5 depicts an exemplary data validation process 500, which may be comprised by the data validation step 208 of FIG. 2. It should be appreciated that the process 500 may begin immediately on a document for which a document type was just determined, or all document types for a batch of documents may be determined before validation proceeds. IN this specific embodiment, the process proceeds immediately after document type determination on a document-by-document basis.

The data validation process 500 begins at block 502 when rules are selected for document validation. The rules may be selected from a database of rules that are applicable, at least initially, in hierarchical fashion according to state, county, or recording jurisdiction, and document type.

At block 504, the document is recognized if not previously recognized during document title determination. At block 506, candidate strings are identified. In this case, candidate strings are identified based on the rules. For example, a rule for a specific document type may require that a grantor name and property legal description be located at specific locations or location ranges on the document. Depending on the specific recording jurisdiction, however, the rules may be much more detailed, requiring that target strings be located for much more narrowly-focused data elements.

At block 508, which may take place at most any point in time once required parameters are known, the data validation server is populated with candidate data elements. The candidate data elements may be obtained from the title plant on the main frame, the data validation server's own data store, the administration server, the image server, an index file associated with the current batch, and/or the like. In a specific example, the acquired data depends on the state and recording jurisdiction (which may come from an index file associated with the batch) and the document type (as determined by the document title identification process). In some cases the acquired data is determined by the specific rules dictated by the foregoing. In some embodiments, the acquired data is updated while processing a single document in response to new rules being selected as will be described hereinafter. Many examples are possible.

The acquired data may be organized into tables, records, lists, or any suitable arrangement. Exemplary data include proper names (which may be segmented according to first, last, middle, suffix, etc.), cities, streets, subdivisions, company names, multi-unit developments, and the like.

At block 510, candidate strings are send to the data validation server for processing. According to this specific embodiment, strings are sent one at a time, compared to target data elements by the validation server at block 512, scored at block 514, and returned to the processing client at block 516, at which point a validity determination is made. The validity determination may be made based on the quality of the comparison match (e.g., percentage) as discussed previously with respect to document title determination. In this case, however, additional steps may be required before data can be confirmed valid, as will be described immediately hereinafter.

At block 518, data validation results are stored. The results may include the data element, a coordinate location on the document at which the data element was located, a match percentage, and/or the like. Based on the result, however, the value of the data element may trigger additional rules. This determination is made at block 520, additional rules are selected at block 522, and the process continues at block 506 with an attempt to locate additional data elements. An example follows.

If a rules for a specific jurisdiction and document type requires an address to be located at a particular location, text strings at and around that location are sent to the data validation server. Assume a text string matches a condominium complex name known to be located in the recording jurisdiction by virtue of the condominium name being in a table of condominium names of the jurisdiction, that table having been loaded onto the data validation server at block 508. Once the condominium name is determined to be valid, at block 516, as a condominium name, the name is stored as such at block 518. The presence of a condominium name in an address search may trigger additional rules at block 520, since condominiums legal descriptions require other types of data elements to be located (e.g., unit name). The other data elements may be located in a specific location with respect to the condominium name. The specific data element and its location may be embodied in a rule unique to the jurisdiction. Further, the specific unit numbers of the specific condominium are likely known for the jurisdiction, and this information may be populated into the data validation server. The new rules related to a condominium are then executed beginning back at block 506.

Continuing with this example, suppose the newly-selected rule specifics that, in this particular recording jurisdiction, a particular unit number typically follows the word "UNIT" and immediately precedes the string "OF <condo_name>," where <condo_name> is the validated condominium name that triggered the new rule. Candidate strings are sent to the data validation server until a suitable match to the structure produces a unit number, which unit number is located in the table of unit number specific to the condominium.

Still continuing with the example, a prior grantee name for the specific unit in the specific condominium also may be known, and a rule may require a comparison of a grantor name, condominium name, and unit number to the corresponding previously-validated grantor name, condominium name and unit number. A comparison at this level of detail performed at block 512 produces a score at block 514 that, with 99% accuracy, the candidate data matches the target data. Hence, the data elements may be determined to be valid at block 516, and are stored at block 518.

While provided as a specific example, the foregoing description should in no way be considered limiting. Other specific examples according to other embodiments can and will depart from this example as will be appreciated by those skilled in the art.

Once all applicable rules for a document have been executed, the process continues to verification, as will be described hereinafter with respect to FIG. 524. It should be noted, however, that not all attempts to validate data elements produce results. If an attempt to locate a particular data element fails, the data element may be populated in the data record associated with the file as a blank, a predetermined code that signals the data to be invalid, the best match of the data, even though it cannot be validated, and/or the like. Nevertheless, the document coordinates at which the data element was expected may be stored for use during data verification as will be described in greater detail below.

Figure 6:
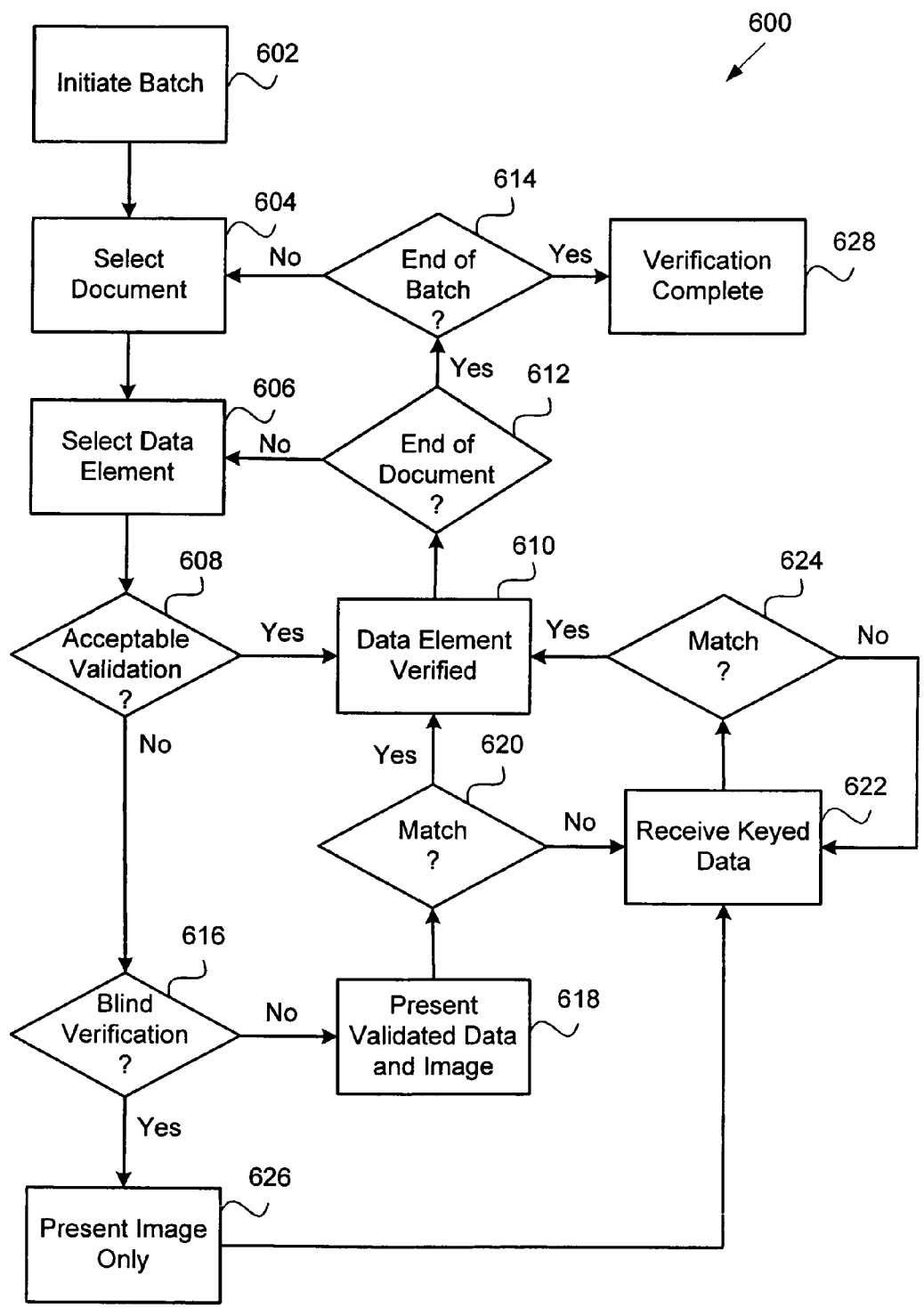
FIG. 6 depicts a data verification process according to embodiments of the invention.

Attention is directed to FIG. 6, which depicts an exemplary data verification process 600 according to embodiments of the invention. The process may be comprised by block 210 of FIG. 2. According to this specific embodiment, unlike the data validation process 500 that takes place on a document-by-document basis, immediately following the document title determination process 300 for each document, the data verification process 600 takes place batch-by-batch, beginning at block 602 with selection of a batch.

Figure 7:
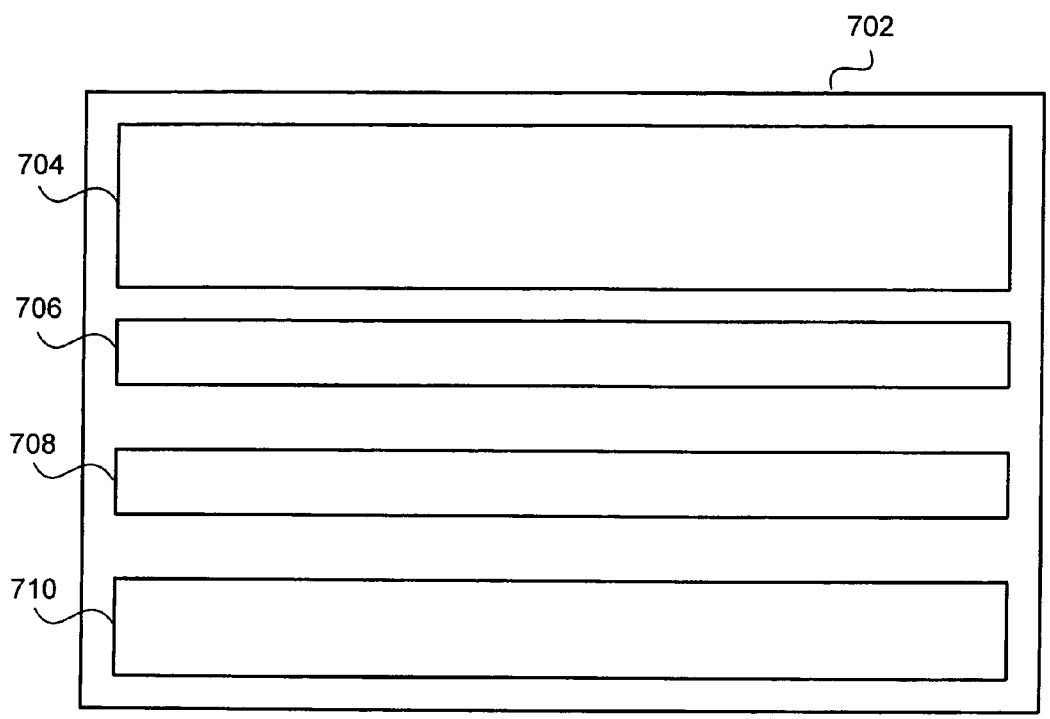
FIG. 7 depicts a data verification process screen view according to embodiments of the invention.

The data verification process involves a human operator using a data verification workstation 116 blindly or non-blindly verifying some or all of the validated data elements for a batch. FIG. 7 depicts a screen view 702 of a data verification application running on the workstation 116. The data verification process 600 will be described in combination with the screen view 702.

Once a batch is selected, documents are selected sequentially through the batch and data elements are sequentially selected through the document. These selections take place at blocks 604 and 606, respectively. At block 608, a determination is made whether the validation results for the selected data element were acceptable. If a predetermined threshold established that a data element validated above the threshold (e.g., 95%) should be considered verified, then any document having a data element with a validation score at or above that threshold is considered verified at block 610. In such cases, the process continues with a determination at block 612 whether all data elements associated with the document have been verified. If not, the next data element is selected at block 606. If so, a determination is made at block 614 whether the end of the batch has been reached. If not, the next document in the batch is selected at block 604.

If the decision at block 608 is that the validation score for a data element is below the predetermined threshold, then the process proceeds to block 616. At this location, a decision is made whether blind verification is required. Blind verification may be required for data elements having validation scores below a predetermined blind verification threshold. If the validation score is sufficiently high that non-blind verification may be used, then the process continues at block 618, at which location the validated data element and associated document image are presented to the operator. This is depicted in FIG. 7.

As stated previously, FIG. 7 depicts a data verification application screen view 702 rendered on a data verification workstation 116 according to embodiments of the invention. The screen view includes a document image window 704, a validated data window 706, a data entry window 708, and a status window 710. This skilled in the art will appreciate that this screen view is merely exemplary of a number of possible verification application screen views. In some embodiments, the various windows may be sized and located according to the operator's preferences.

The document image window 704 works in concert with a viewer application to display selected document images or portions thereof to the operator. For example, when a particular data element is being validated, the corresponding portion of the document image from which the validated data was obtained in displayed automatically in the document image window 704. This may be the case without regard to whether the validation process actually produced data. The validated data window 706, in the case of non-blind verification, displays the validated data for the data element. If the validated data matches what the operator sees in the document image window 704, then the operator may simply select a key that indicates the data is verified. If corrections are required, however, the operator may simply correct the validated data in the validated data window 706. In some embodiments, the operator re-keys the data element in the data entry window 708. For blind verification, as will be described in greater detail below, the user keys data into the data entry window 708 according to what he sees in the document image window 704. If the data fails to match the validated data, the operator may be prompted to reenter some or all of the data.

The document image window 704 displays the portion of the document image for a particular data element based on the coordinates stored during the data validation process. In some cases, the wrong portion is displayed. Hence, the operator may be able to assume control of the image and manipulate it to see other portions of the document. Otherwise, the process proceeds automatically.

In some embodiments, color windowing may be used to direct an operator's attention to a particular portion of the image and/or alert the operator to the presence of a low threshold match from data validation. That way, the operator can pay particular attention to correctly keying the data.

In some embodiments, several data elements may be verified simultaneously. For example, a grantor's name may have several elements: first, middle, and last name, prefix, suffix, etc. All these elements may be prompted during a single data entry presentation. Those skilled in the art will appreciate that the foregoing description of the data verification application screen view 702 is merely exemplary of myriad possible embodiments.

Returning to the data verification process 600 of FIG. 6, during non-blind verification at block 620, an operator evaluates whether the validated data matches what the operator sees on the document image. If the data matches, the operator advances the process to block 610 and the process continues as before with selecting the next data element or document. Otherwise, the process continues at block 622, at which point the operator keys information representative of the data element or otherwise corrects the validated data. If the operator enters the entire data element in a separate window, then the data keyed by the operator is compared to the validated data at block 624. If it matches, the process continues to block 610. Otherwise the operator is prompted to re-key the date at block 622.

If the determination at block 626 is that the validated data must be blind verified, then only the document image is presented at block 626. The operator keys the data at block 622, and the entry is compared to the validated data at block 624. If the entry does not match, the operator will be prompted to re-key the data at block 622.

Once all data elements for an entire batch are verified, the process is compete at block 628. The data elements may then be placed into the title plant for commercial use.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to processes for extracting data from property records. For example, the present invention may be used to extract data from UCC filings, NSA filings, other public records, and other documents generally. Accordingly, the above description should not be taken as limiting the scope of the invention, which is defined in the following claims.

What is claimed is:

1. A system configured to extract data from a document image and validate the extracted data, the system comprising:
a computer having a processor and memory, wherein the computer is in communication with an image database and a server, wherein the computer includes:
means for selecting a document classification for a document image received from the image database, wherein the document image includes text, the classification is selected from a plurality of predetermined document classifications based, at least in part, on a first set of recognized text, and the document is selected from a group of documents consisting of:
a warranty deed;
a quit claim deed;
a mortgage; and
a release;
means for selecting rules from a database of rules based on the document classification, wherein the rules define data elements to be populated based on a second set of recognized text;
means for selecting target data elements from a database of data elements based, at least in part, on the selected document classification and the selected rules, wherein the data elements include at least two data elements selected from a list of data elements consisting of:
grantor name;
grantee name;
legal description; and
property address;
means for recognizing selected portions of the document image, wherein the selected portions are determined, at least in part, by the selected rules and wherein the means for recognizing selected portions of the document image generates one or more character strings based on the second set of recognized text;
means for comparing a specific character string to a target data element, wherein the means for comparing produces a match measure based at least in part on the comparison;
means for creating validated data based on the character string and the match measure wherein the validation process pairs various combinations of generated character strings with corresponding pairs of target data elements; and
means for storing the validated data at the server.

2. The system of claim 1, wherein the means for storing the validated data includes means for storing the match measure.

3. The system of claim 1, wherein the selected portions have document coordinates associated therewith and wherein the means for storing the validated data includes means for storing the document coordinates.

4. The system of claim 1, wherein the database of data elements comprises a title plant.

5. The system of claim 4, wherein the document comprises a recorded property transfer document.

6. The system of claim 1, further comprising means for selecting additional rules from the database of rules based on the validated data.

7. The system of claim 1, further comprising means for comparing a plurality of distinct character strings to a plurality of distinct data elements, wherein the means for comparing produces a match measure based at least in part on the comparison.

8. A non-transitory computer-readable storage medium having a computer-readable program embodied therein for extracting data from a document image, the computer-readable program including instructions for:
selecting a document classification for the document image, wherein the document image includes text, the classification is selected from a plurality of predetermined document classifications based, at least in part, on a first set of recognized text, and the document is selected from a group of documents consisting of:
a warranty deed;
a quit claim deed;
a mortgage; and
a release;
selecting rules from a database of rules based on the document classification, wherein the rules define data elements to be populated based on a second set of recognized text;
selecting target data elements from a database of data elements based, at least in part, on the selected document classification and the selected rules, wherein the data elements include at least two data elements selected from a list of data elements consisting of:
grantor name;
grantee name;
legal description; and
property address;
recognizing selected portions of the document image, wherein the selected portions are determined, at least in part, by the selected rules and wherein recognizing selected portions of the document image generates one or more character strings based on the second set of recognized text;

comparing a specific character string to a target data element, wherein comparing produces a match measure based at least in part on the comparison;
creating validated data based on the character string and the match measure, wherein the validation process pairs various combinations of generated character strings with corresponding pairs of target data elements; and
storing the validated data as a data element.

9. The computer-readable storage medium of claim 8, wherein the instructions further comprise instructions for storing the match measure.

10. The computer-readable storage medium of claim 8, wherein the selected portions have document coordinates associated therewith, wherein the instructions further comprise instructions for storing the document coordinates.

11. The computer-readable storage medium of claim 8, wherein the database of data elements comprises a title plant.

12. The computer-readable storage medium of claim 8, wherein the document comprises a recorded property transfer document.

13. The computer-readable storage medium of claim 8, wherein the instructions further comprise instructions for selecting additional rules from the database of rules based on the validated data.

14. The computer-readable storage medium of claim 8, wherein the instructions further comprise instructions for comparing a plurality of distinct character strings to a plurality of distinct data elements, wherein comparing produces a match measure based at least in part on the comparison.

15. A system for extracting data from document images, comprising:
    an image database configured to receive and store document images, wherein the images are arranged into batches of images;
    an administration server configured to select image batches for a data extraction process, the administration server having a rules database associated therewith;
    one or more production clients each configured to respond to commands from the administration server to execute the data extraction process; and
    a validation server configured to store a plurality of data elements;
    wherein a production client, in executing the data extraction process:
        selects a document classification for a document image, wherein the document image includes text, wherein the classification is selected from a plurality of predetermined document classifications based, at least in part, on a first set of recognized text, and the document is selected from a group of documents consisting of:
            a warranty deed;
            a quit claim deed;
            a mortgage; and
            a release;
        selects rules from the rules database based on the document classification, wherein the rules define data elements to be populated based on a second set of recognized document text;
        recognizes selected portions of the document image, wherein the selected portions are determined by the selected rules and wherein recognizing selected portions of the document image generates one or more character strings based on the second set of recognized text;
        sends character strings to the validation server for comparison to target data elements selected from a database of data elements based, at least in part, on the selected document classification and the selected rules, wherein the data elements include at least two data elements selected from a list of data elements consisting of:
            grantor name;
            grantee name;
            legal description; and
            property address;
        for a specific character string, receives a match measure from the validation based on a comparison of the specific character string to a specific data element;
        for the specific character string, creates validated data based on the character string and the match measure, wherein the validation process pairs various combinations of generated character strings with corresponding pairs of target data elements; and
        stores the validated data as a data element.

16. The system of claim 15, wherein the production client, in executing the data extraction process selects additional rules from the database of rules based on the validated data.

17. The system of claim 1, wherein the match measure is determined by comparing the number of matching characters out of the number of characters compared.

18. The system of claim 1, wherein the match measure comprises a percentage.

19. The non-transitory computer-readable storage medium recited in claim 8, wherein the match measure is determined by comparing the number of matching characters out of the number of characters compared.

20. The system of claim 1, wherein the match measure comprises a percentage.

* * * * *